United States Patent
Bowen

(10) Patent No.: US 10,498,885 B2
(45) Date of Patent: Dec. 3, 2019

(54) SYSTEMS AND METHODS FOR USE IN PROVIDING LOCATION SERVICES

(71) Applicant: MASTERCARD INTERNATIONAL INCORPORATED, Purchase, NY (US)

(72) Inventor: Leonard Carson Bowen, St. Charles, MO (US)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 0 days.

(21) Appl. No.: 15/851,009

(22) Filed: Dec. 21, 2017

(65) Prior Publication Data
US 2019/0199855 A1    Jun. 27, 2019

(51) Int. Cl.
H04M 3/42    (2006.01)
H04M 7/00    (2006.01)

(52) U.S. Cl.
CPC ....... H04M 3/42348 (2013.01); H04M 7/006 (2013.01); H04M 2242/04 (2013.01); H04M 2242/30 (2013.01)

(58) Field of Classification Search
CPC ............. H04M 3/42348; H04M 7/006; H04M 2242/30; H04M 2242/04
See application file for complete search history.

(56) References Cited

U.S. PATENT DOCUMENTS

| 7,330,464 B2 | 2/2008 | Brouwer et al. | |
| 9,642,167 B1* | 5/2017 | Snyder | H04W 4/021 |
| 2007/0242660 A1* | 10/2007 | Xu | H04M 7/006 |
| | | | 370/352 |
| 2018/0063323 A1* | 3/2018 | Nelson | H04M 3/42357 |

OTHER PUBLICATIONS www.cisco.com/c/en/us/td/docs/security/ise/1-2/api_ref_guide/api_ref-book/ise_api_ref_ch1.html; Cisco Identity Services Engine API Reference Guide; Updated Feb. 22, 2017; 6 pgs.
https://supportforums.cisco.com/document/113406/cisco-emergency-responder-cer-explained; Kevin Lang, Oct. 2, 2012; 24 pgs.
(Continued)

*Primary Examiner* — Chuong A Ngo
(74) *Attorney, Agent, or Firm* — Harness, Dickey & Pierce, P.L.C.

(57) ABSTRACT

Systems and methods are provided for use in dynamically providing location services, in connection with mobile communication devices. One exemplary method includes receiving a media access control (MAC) address for a mobile communication device initiating a VoIP emergency call via a VoIP application, where the mobile communication device is connected to a network platform and initiating the VoIP emergency call through the network platform. The exemplary method further includes requesting, from a server of the network platform, a designation for a switch and/or port, and/or an access point, through which the mobile communication device is connected to the network platform and server. The exemplary method additionally includes retrieving, from a data structure, a physical location associated with the mobile communication device, based on the designation, and transmitting the physical location.

17 Claims, 3 Drawing Sheets

(56) References Cited

OTHER PUBLICATIONS http://www.bicsi.org/pdf/presentations/winter_11/Addressing%20E-911%20Compliance%20with%20with%20VoIP%20Systems%20-%20Herb%20Congdon%20-20Gene%20Malone.pdf; Winter Conference Field Report, Jan. 16, 2011; 36 pgs.
https://social.technet.microsoft.com/Forums/lync/en-US/16e533cc-a188-421b-a73c-e00f801289b7/setcslisswitch-and-macresolverurl?forum=ocsvoice; accessed Oct. 12, 2017; 4 pgs.
Microsoft Virtual Academy, Module 5, Configuring and Deploying Emergency Calling, MVA Jump Start; https://mva.microsoft.com/Search/SearchResults.aspx; © 2013; 34 pgs.

\* cited by examiner

SYSTEMS AND METHODS FOR USE IN PROVIDING LOCATION SERVICES

FIELD

The present disclosure generally relates to systems and methods for use in providing location services, and in particular, to systems and methods for use in providing location services, as associated with mobile communication devices, in connection with emergency communications from the mobile communication devices.

BACKGROUND

This section provides background information related to the present disclosure which is not necessarily prior art.

Within various environments, mobile communication devices, such as, for example, smartphones, laptops, etc., have become ubiquitous. The mobile communication devices are often relied upon, by users, to accomplish various tasks. In connection therewith, mobile communication devices have taken the place of many immobile communication devices, such as, for example, desktop computers, etc. What's more, mobile telephones, or cellular phones (associated with a mobile calling network (e.g., Sprint®, Verizon®, AT&T®, etc.)), have taken the place of LAN line telephones within both residential and business environments. More recently, with the advent of voice over Internet Protocol (VoIP), mobile communication devices have been adapted to facilitate phone calls initiated by the users, whereby the mobile communication devices are not associated with and/or enabled with a mobile calling network. Regardless of whether mobile telephone devices are used with a mobile calling network or VoIP, as a function of replacing LAN line telephones, all are useable to make emergency phone calls, whereby it is desirable and/or required for the devices to provide locations of the users to recipients of the emergency phone calls to help the recipients in providing aid to the users making the calls.

To provide the locations of the users, certain techniques have been attempted and/or implemented in connection with mobile communication devices. For example, U.S. Pat. No. 7,330,464 describes assigning a secondary directory telephone number (SDN) either to each VoIP port used by subscribers or to each public safety access point (PSAP). The SDN, media access control (MAC) address of the IP port accessed by a subscriber, and geographic location of the SDN or MAC address are stored in a database. This information is accessed by the PSAP based on the SDN or MAC address to obtain the location of a VoIP subscriber to facilitate providing emergency services in response to a 911 call by a VoIP subscriber.

It is also known to specifically define static subnets within a network, whereby each subnet is associated with a particular physical location.

In yet another known technique, a device running a VoIP application on Windows 10 may utilize link layer discovery protocol (LLDP) to facilitate location determination.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Exemplary embodiments will now be described more fully with reference to the accompanying drawings. The description and specific examples included herein are intended for purposes of illustration only and are not intended to limit the scope of the present disclosure.

When a user makes an emergency phone call, using a VoIP application associated with and/or installed in a mobile communication device, a physical location of the mobile communication device is not readily apparent simply based on the calling party number, like in the past with LAN line telephone services. Uniquely, the systems and methods herein permit the particular location of a mobile communication device to be reliably determined, in connection with an emergency phone call, via a VoIP application, regardless of the mobile communication device's operating system, location, or point of connection to a network platform. In particular, for an emergency VoIP call, a VoIP application and/or a backend server associated with the VoIP application (not shown) is configured to transmit a MAC address, of the mobile communication device making the VoIP call, to a location engine. The location engine, in turn, then, makes a call (e.g., a REST API call) to a server of the network platform (e.g., a monitoring server implementing an identity services engine (ISE), etc.), which returns, to the location engine, the switch and/or port designation for the connection of the mobile communication device to the network platform. The location engine then retrieves the physical location for the switch and/or port and reports the same to the VoIP application and/or backend server, for association with the emergency VoIP call. The physical location may then be used, for example, to dispatch assistance and/or medial help to the location, as desired and/or needed, from the emergency call.

In this unique manner, the particular location of the mobile communication device may be determined dynamically, based on the location associated with the switch and/or port for the connection of the mobile communication device. The particular location may, among other things, be determined independent of the mobile communication device's operating system (e.g., independent of whether the device is running an operating system other than Windows 10 that does not support LLDP, etc.) and without the complexity attendant to relying on an SDN or MAC address of an IP port accessed by the mobile communication device. The particular location may also, among other things, be determined without the need to rely on subnets, which today may span across many physical locations (e.g., multiple campuses and even globally, etc.), thereby rendering it impracticable or even impossible to associate a particular subnet with a particular physical location.

Figure 1:
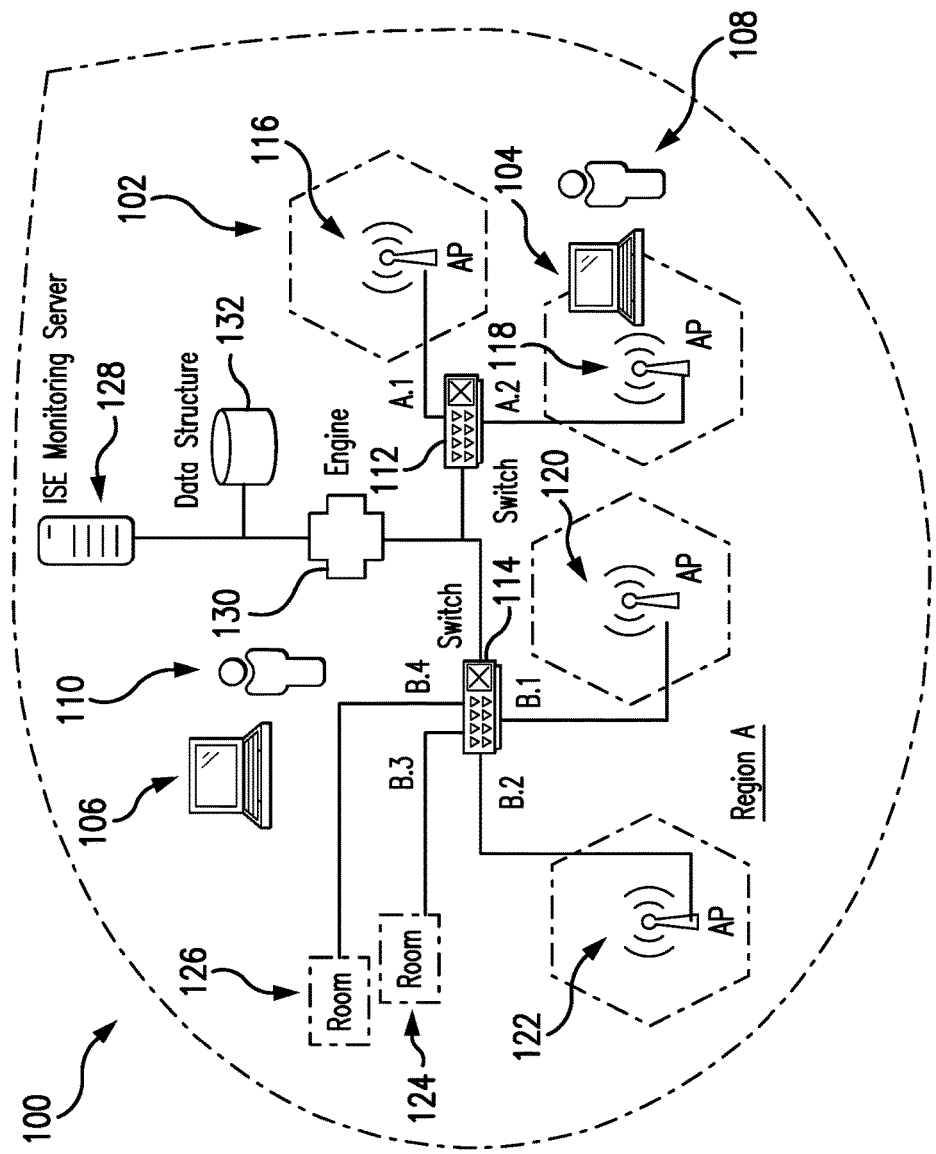
FIG. 1 illustrates an exemplary system of the present disclosure suitable for use in providing location services in connection with an emergency communication from a mobile communication device.

FIG. 1 illustrates an exemplary system 100, in which one or more aspects of the present disclosure may be implemented. Although the system 100 is presented in one arrangement, other embodiments may include the parts of the system 100 (or other parts) arranged otherwise depending on, for example, architectures of wireless networks for use by mobile communication devices, dispersal of mobile communication devices, etc.

The system 100 generally includes a network platform 102 and multiple mobile communication devices 104 and 106, which are coupled to the network platform 102. The network platform 102 is configured to provide a wireless network, for accessing the mobile communication devices 104 and 106, when located within a coverage of the network, as defined by a region, which is referenced Region A, in FIG. 1. In general, Region A is a business environment, such as a company, in which employees, broadly, users, are able to move about the region to perform job tasks. Here, as shown, the mobile communication device 104 is associated with a user 108, and the mobile communication device 106 is associated with a user 110. In one example, the business environment operates according to an open seating policy, whereby each user is able to select a location, for example, at a desk, for working for an hour, all day or some other duration. Generally, however, regardless of the seating options/policies, the users 108 and 110 are mobile within the business environment (and therefore within Region A).

The network platform 102 includes multiple switches 112 and 114 and multiple access points (APs) 116, 118, 120, and 122, through which the wireless network is provided to Region A. Each of the switches 112 and 114 includes multiple switch ports, which, in turn, may be connected to one of the access points 116, 118, 120, and 122. As shown, both the access points 116 and 118 are coupled to the switch 112, but the access point 120 is coupled to Port A.1 of the switch 112, while access point 118 is coupled to Port A.2 of the switch 112. Similarly, the access point 120 is coupled to Port B.1 of the switch 114, and the access point 122 is coupled to the Port B.2 of the switch 114. Each of the access points 116, 118, 120, and 122 generates and/or provides a wireless network, as indicated by the dotted enclosure associated therewith, which is accessible to mobile communication devices that are within the range of the wireless network (e.g., devices 104 and 106, etc.). Additionally, or alternately, one or more rooms, cubicles, workstations, etc., may be hardwired from the switch 114. In the illustrated system, for example, Port B.3 of the switch 114 is routed to Room 124 and Port B.4 is routed to Room 126. It should be appreciated that the network platform 102 may be configured otherwise in other embodiments, and, often, will include additional switches and/or access points. The number of switches and/or access points, for example, may depend on the type of switches and/or access points, coverage provided by different network platforms, etc.

The mobile communication devices 104 and 106, in this exemplary embodiment, are each associated with users 108 and 110, respectively, and are illustrated as including laptop computing devices, which are mobile with Region A. It should be appreciated, though, that other communication devices (e.g., smartphones, tablets, etc.) and/or other types of computing devices may similarly be included in the system 100 or in systems in other embodiments. It should also be appreciated that as the user 108, for example, may move through Region A, such that the mobile communication device 104 associated with the user 108 may connect with and/or hop between the different access points 116, 118, 120, and 122, for example, based on a signal strength of the access point for the mobile communication device 104. As such, the mobile communication device 104, for example, may be connected to any of the access points 116, 118, 120, and 122, and consequently, any of Ports A1, A2, B.1, or B.2, whereby the mobile communication device 104 could be connected through the respective one of the ports of the switch 112 or 114. Additionally, as applicable, the user 108 may, for example, plug in to the network platform, via a wired network cable in Room 124, thereby connecting through the Port B.3 of the switch 114 or in Room 126, thereby connecting through the Port B.4 of the switch 114. In connection therewith, and as will be described more below, as the user 108 moves (and the corresponding communication device 104), the MAC/switch port/wireless AP information, etc. associated with the communication device 104 may update dynamically, as it reconnects/re-authenticates to the network(s). This similarly applies for the communication device 106 (and the user 110).

In addition, the mobile communication device 104 and 106 each include a VoIP application, such as, for example, a Skype® application, a Lync® application, etc. The VoIP application, in general, enables the mobile communication devices 104 and 106 to make VoIP calls to other users within Region A, or outside Region A.

With continued reference to FIG. 1, the system 100 also includes an ISE monitoring server 128 (or ISE) (e.g., implementing a Cisco® Identity Services Engine, etc.) (e.g., as part of the network platform 102, etc.). The ISE monitoring server 128 is configured, with the network platform 102, to facilitate access control for the network platform 102. In connection therewith, the ISE monitoring server 128 is configured to require devices (e.g., mobile communication devices 104 and 106, etc.) seeking access to the network platform 102 to authenticate themselves with the network platform 102 and/or the ISE monitoring server 128. In this manner, a device at a particular location (e.g., mobile communication device 104 or 106 in Region A, etc.) seeking access to the network platform 102 may provide a form of authentication to one (or both) of the switches 112 or 114 (potentially, via one or more of the access points 116, 118, 120, or 122, etc.) through which the device is attempting to access the network platform 102. The switch 112 and/or 114, then, may pass the form of authentication to the ISE monitoring server 128, which may authenticate and allow the device access to the network platform 102. The ISE monitoring server 128, then, in connection with the authentication, may store information regarding the authenticated device, such as, for example, a designation of the switch and/or port (e.g., switch 112 and/or 114, etc.) through which the device is accessing the network platform 102, a designation of an access point through which the device is accessing the network platform 102, the device's MAC address, the device's user ID, the device's machine ID, and/or the time of authentication, etc. In connection therewith, the ISE monitoring server 128 may be configured to return some or all of this information in response to a call (e.g., a REST API call, etc.). The call may include an identifier therewith (e.g., a MAC address, etc.) associated with the device for which information is sought from the ISE monitoring server 128.

It should be appreciated that the designations stored and/or returned by the ISE monitoring server 128 may be names, identities, descriptions, codes, and/or any other designations sufficient for identification, etc. For example, the ISE monitoring server 128 in exemplary system 100 may be configured such that the designation for port B.4 of switch 114 is "Switch 114 Port B.4," or is the network address for port B.4 of switch 114, or is a code for port B.4 of switch 114 (e.g., "SW114B4", etc.), or is any other designation sufficient to identify the switch 114 and/or port B.4 and/or distinguish the switch 114 and/or port B.4 from other switches and/or ports on the network platform 102. As another example, the ISE monitoring server 128 in the exemplary system 100 may be configured such that the designation for access point 122 is "Access Point 122," or is the network address for access point 122, or is a code for access point 122 (e.g., "AP122," etc.), or is any other designation sufficient to identify the access point and/or distinguish the access point 122 from other access points on the network platform 102.

Further, when mobile communication devices 104 and/or 106 are authenticated to the network platform 102 and/or ISE monitoring server 128, it should be appreciated that the ISE monitoring server 128 may be configured to dynamically provide designations for the switch and/or port, or the appropriate access points 116, 118, 120, and 122, through which the mobile communication devices 104 and 106 are accessing the network and/or platform 102. For example, mobile communication device 106 may attempt to access the network platform 102 via port B.4 of switch 114 while in Room 126 of Region A. Upon authentication with the ISE monitoring server 128, the mobile communication device 106 may access the network platform 102. The ISE monitoring server 128, then, may be configured to return, in response to a call that includes the MAC address of mobile communication device 106, a designation for port B.4 of switch 114, thereby indicating that mobile communication device 106 is accessing the network platform 102 via port B.4 of switch 114. Later, mobile communication device 10 may re-locate and attempt to access the network platform 102 via port B.3 of switch 114 while in Room 124 of Region A. Again, upon authentication with the ISE monitoring server 128, the mobile communication device 106 may access the network platform 102. The ISE monitoring server 128, then, may be configured to return, in response to a call that includes the MAC address of mobile communication device 106, a designation for port B.3 of switch 114, thereby indicating that mobile communication device 106 is accessing the network platform 102 via port B.3 of switch 114. Thus, it should be appreciated that the ISE monitoring server 128 may store and return current information (e.g., a switch and/or port designation, an access point designation, etc.) associated with a device that is accessing the network platform 102 and authenticated via the ISE monitoring server 128.

Figure 2:
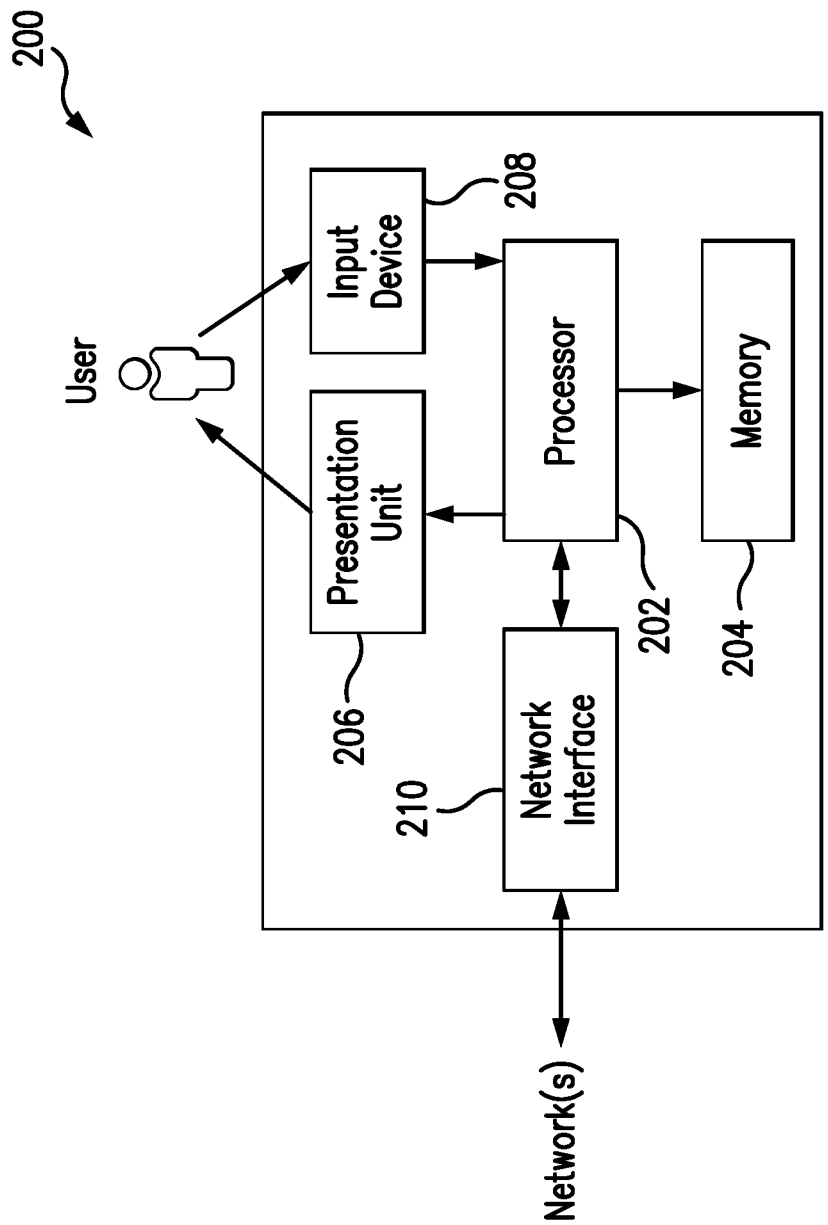
FIG. 2 is a block diagram of a computing device that may be used in the exemplary system of FIG. 1.

FIG. 2 illustrates an exemplary computing device 200 that may be used in the system 100. The computing device 200 may include, for example, one or more servers, workstations, laptops, tablets, smartphones (or other communication devices), etc. In addition, the computing device 200 may include a single computing device, or it may include multiple computing devices located in close proximity or distributed over a geographic region, so long as the computing devices are configured to function as described herein. In the system 100, the mobile communication devices 104 and 106, and also the switches 112 and 114 and the access points 116, 118, 120, and 122 are each computing devices that may be consistent with the computing device 200. In addition, the ISE monitoring server 128 may be considered a computing device consistent with computing device 200. That said, however, the system 100 should not be considered to be limited to the computing device 200, as described below, as different computing devices and/or arrangements of computing devices may be used. In addition, different components and/or arrangements of components may be used in other computing devices.

Referring to FIG. 2, the exemplary computing device 200 includes a processor 202 and a memory 204 coupled to (and in communication with) the processor 202. The processor 202 may include one or more processing units (e.g., in a multi-core configuration, etc.). For example, the processor 202 may include, without limitation, a central processing unit (CPU), a microcontroller, a reduced instruction set computer (RISC) processor, an application specific integrated circuit (ASIC), a programmable logic device (PLD), a gate array, and/or any other circuit or processor capable of the operations described herein.

The memory 204, as described herein, is one or more devices that permit data, instructions, etc., to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 204 may be configured to store, without limitation, MAC addresses; physical location tables based on access points, ports, switches, etc.; and/or other types of data (and/or data structures) suitable for use as described herein. Furthermore, in various embodiments, computer-executable instructions may be stored in the memory 204 for execution by the processor 202 to cause the processor 202 to perform one or more of the functions described herein, such that the memory 204 is a physical, tangible, and non-transitory computer readable storage media. Such instructions often improve the efficiencies and/or performance of the processor 202 that is performing one or more of the various operations herein.

In the exemplary embodiment, the computing device 200 also includes a presentation unit 206 that is coupled to (and in communication with) the processor 202 (however, it should be appreciated that the computing device 200 could include output devices other than the presentation unit 206, etc.). The presentation unit 206 outputs information, visually or audibly, for example, to a user of the computing device 200, etc. The presentation unit 206 may include, without limitation, a liquid crystal display (LCD), a light-emitting diode (LED) display, an organic LED (OLED) display, an "electronic ink" display, speakers, etc. In some embodiments, presentation unit 206 may include multiple devices.

In addition, the computing device 200 includes an input device 208 that receives inputs from the user (i.e., user inputs). The input device 208 is coupled to (and is in communication with) the processor 202 and may include, for example, one or more of a keyboard, a pointing device, a mouse, a camera, a touch sensitive panel (e.g., a touch pad or a touch screen, etc.), and/or other suitable input device. Further, in various exemplary embodiments, a touch screen may behave as both the presentation unit 206 and the input device 208.

Further, the illustrated computing device 200 also includes a network interface 210 coupled to (and in communication with) the processor 202 and the memory 204. The network interface 210 may include, without limitation, a wired network adapter, a wireless network adapter, a mobile network adapter, or other device capable of communicating to one or more different networks, for example, as provided by the network platform 102. Further, in some exemplary embodiments, the computing device 200 may include the processor 202 and one or more network interfaces (e.g., including the network interface 210, etc.) incorporated into or with the processor 202. In general, the computing device 200 is associated with a media access control (MAC) address, which is a unique identifier assigned to the network interface 210. The MAC address is a hardware address for the network interface 210, and thus, is static for the computing device 200 (unless the network interface 210 is changed).

Referring again to FIG. 1, the system 100 includes a location engine 130 and a data structure 132 coupled to the location engine 130. The location engine 130 is illustrated as a standalone part of the system 100 and, in this manner, may be considered as one or more specific computing devices consistent with computing device 200. Additionally, or alternatively, the location engine 130 may be integrated, in whole or in part, into one or more other computing devices, such as, for example, a network server (e.g., the ISE monitoring server 128, etc.), etc., which is included in the network platform 102, or spiraled therefrom. In addition, the location engine 130 is coupled to the data structure 132, which may be standalone from the location engine 130 or integrated in whole, or in part, therewith. When the data structure 132 is standalone from the location engine 130, it may also be considered a computing device generally consistent with computing device 200.

In this exemplary embodiment, the data structure 132 includes a physical location table, which includes a location associated with each of the switches 112 and 114 and/or each of the access points 116, 118, 120, and/or 122. The associated location, in general, is a specific physical location, as indicated by a description. The description may include, for example, a room designation, a building designation (e.g., floor, direction (e.g., west corridor on the third floor, etc.), etc.), a longitude/latitude, a region indication, combinations thereof, or other suitable description of a physical location, etc. The associated location is the location from which devices may connect to the given switch and/or port (or access point), and is not necessarily the specific location of the switch and/or port (or access point). For example, port B.4 of switch 114 may be associated with Room 126 (e.g., the location from which devices use port B.4 of switch 114 to connect to the network platform 102, etc.) in the data structure 132, even though port B.4 of switch 114 may, in some embodiments, be disposed away from Room 126. The associated location thus, in general, indicates a specific physical location of a mobile communication device that is accessing the network platform 102 via the associated switch and/or port (and/or access point).

With that said, the location engine 130 is particularly configured (e.g., via executable and/or hardware-based instructions, etc.) to perform the operations described herein to facilitate identification of a location of the mobile communication device 104 and/or the user 108, for example, in connection with an emergency call through the VoIP application included in the mobile communication device 104.

Specifically, for example, upon initiation of an emergency call from the VoIP application at the device 104, the VoIP application and/or a backend server associated with the VoIP application (not shown) is configured to transmit a MAC address of the mobile communication device 104 (which, in this example, is authenticated to the ISE monitoring server 128) to the location engine 130 as part of a call to the location engine 130 (e.g., a MACResolverURL function call, etc.). In response to the call and upon receipt of the MAC address, the location engine 130 is configured to call the ISE monitoring server 128, shown in FIG. 1 (e.g., via a REST API call, etc.), including the MAC address, whereby the ISE monitoring server 128 may identify the switch and/or port (and/or access point) through which the mobile communication device 104 is connected to the network platform 102, based on the device's MAC address, and then return the switch and/or port (and/or access point) designation to the location engine 130 (again, consistent with the above).

Thus, it should be appreciated that by the VoIP application and/or backend server associated therewith calling the location engine 130 (e.g., via a MACResolverURL function call, etc.) as described above, the location engine 130 may determine the switch and/or port (and/or access point) through which the mobile communication device 104 is accessing the network platform 102 (or any other device accessing the network platform 102 and authenticated with the ISE monitoring server 128). If the mobile communication device 104 (or any other authenticated device) later changes locations to access the network platform 102 via a new switch and/or port (and/or access point) (e.g., as in the example above where mobile communication device 106 moves from Room 126 to Room 124 of Region A), the location engine 130 may determine (generally dynamically) the new the switch and/or port (and/or access point) through which the mobile communication device 104 (or any other device) is accessing the network platform 102 (generally transparently to the corresponding user 108, etc.).

In turn in the system 100, the location engine 130 is configured to look up, based on the switch and/or port designation and/or access point designation returned by the ISE monitoring server 128, the switch and/or port (and/or access point) in the data structure 132 to identify and/or retrieve a location associated with the switch and/or port in the data structure 132 and/or a location associated with the access point. The location associated with the switch and/or port (and/or access point) will describe a specific physical location (e.g., an office, workstation, or cubicle, for example, associated with the switch and/or port and/or a coverage area for an access point, etc.). The location engine 130 is configured to then return the physical location to the VoIP application and/or backend server, which made the call to the location engine 130 (e.g., the MACResolverURL function call, etc.) and from which the MAC address was transmitted. The VoIP application and/or backend server is then configured to store the location in association with the emergency call (e.g., in a database, etc.) and/or append the location to the emergency call thereto, whereby the entity receiving and/or handling the emergency call (e.g., a public-safety access point (PSAP), etc.) may receive the location. It should be appreciated that the receiving and/or handling entity may be configured to receive the location by accessing the stored location (e.g., from a database, etc.) and/or as part of the emergency call itself. The location description may then be used, for example, to dispatch assistance and/or medial help to the location, as desired and/or needed, from the emergency call. In this manner, the VoIP application and/or backend server may employ the location engine 130 to dynamically determine the current location of a mobile communication device and provide that location during an emergency call, even when the user of the mobile communication device may have recently relocated from one physical location to another.

Figure 3:
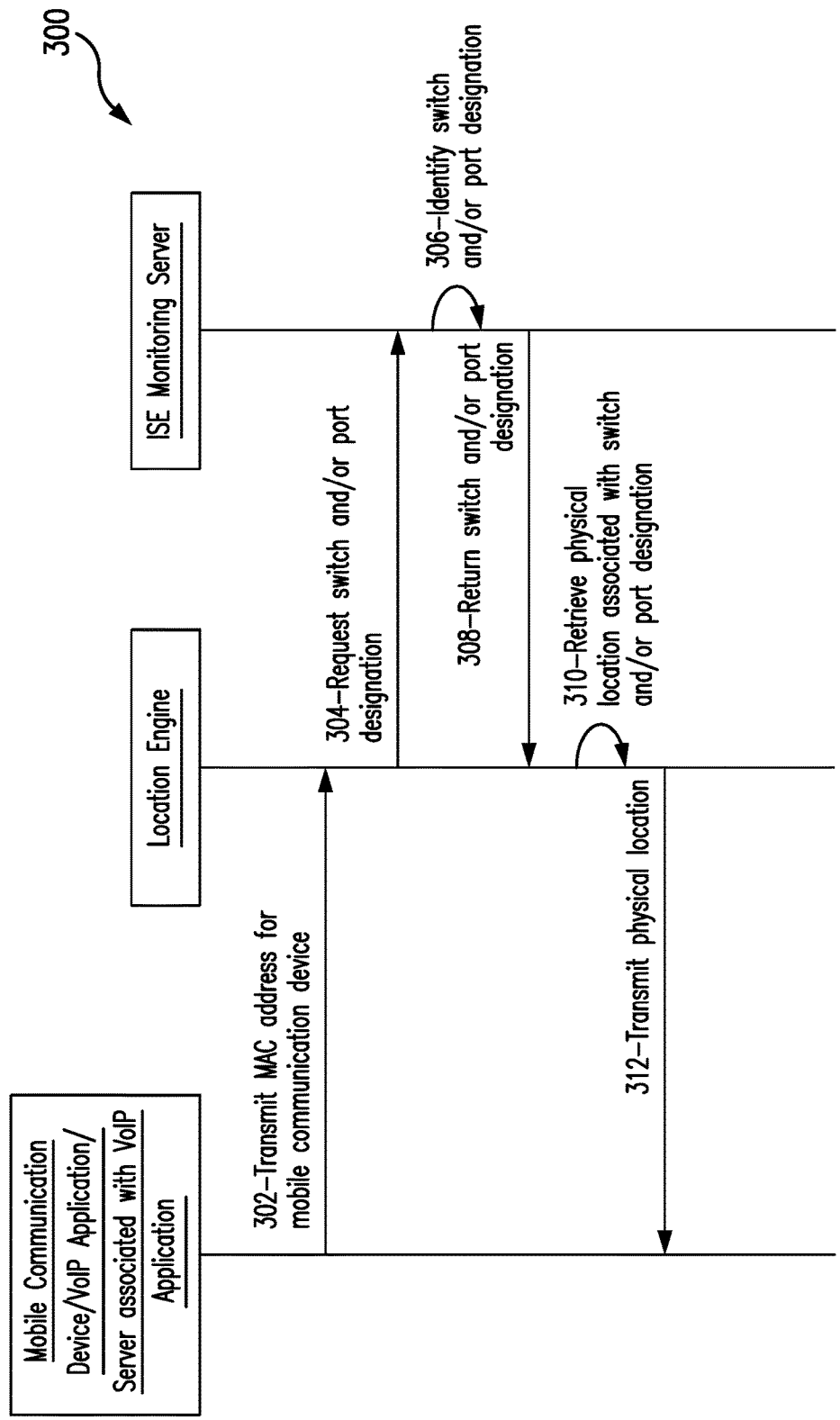
FIG. 3 is an exemplary method, which may be implemented in connection with the system of FIG. 1, for providing location services in connection with an emergency communication from a mobile communication device.

FIG. 3 illustrates an exemplary method 300 for use in providing location services in connection with an emergency communication from a mobile communication device. In this exemplary embodiment, the method 300 is described with reference to the system 100, including mobile communication device 106, network platform 102, switches 112 and 114, access point 116, location engine 130, ISE monitoring server 128, and data structure 132, and further with reference to the computing device 200. It should be appreciated, however, that the methods herein are not limited to the system 100 and the computing device 200, and that the systems and computing devices herein are not limited to method 300.

In method 300, a mobile communication device (e.g., mobile communication device 106, etc.) is initially authenticated to the network platform 102 via the ISE monitoring server 128 and connected to the network platform 102 from a specific physical location (e.g., Room 126 in Region A, etc.) via a switch and/or port (and/or access point) (e.g., port B.4 of switch 114, etc.). The user (e.g., user 110, etc.) of the mobile communication device (e.g., device 106, etc.) initiates an emergency call through the network platform 102 using a VoIP application (e.g., Skype®, etc.). In connection therewith, a backend server associated with the VoIP application, the VoIP application, and/or the mobile communication device itself transmits the media access control (MAC) address for the given device to the location engine 130 (e.g., as part of a MACResolverURL function call to the location engine 130, etc.).

In connection therewith, the location engine 130 initially receives, at 302, the MAC address for the mobile communication device (e.g., device 106) initiating the VoIP emergency call. The location engine 130 may store the MAC address in memory associated therewith (e.g., in memory 204, etc.).

In turn, the location engine 130 requests, at 304, the switch and/or port designation (and/or access point designation), for the switch and/or port (and/or access point) through which the mobile communication device (e.g., device 106, etc.) is connected to the network platform 102, from the ISE monitoring server 128. For example, the location engine 130 may submit a REST API call to the ISE monitoring server 128, where the call includes the MAC address of device 106. Consistent with the above description, in response to the request, the ISE monitoring server 128 identifies, at 306, a switch and/or port (and/or access point) designation (e.g., a designation for port B.4 of switch 114) and returns (or transmits), at 308, the switch and/or port designation to the location engine 130.

Then in the method 300, at 310, the location engine 130 retrieves from data structure 132 a physical location associated with the returned switch and/or port (and/or access point) designation (e.g., for port B.4 of switch 114, etc.). For example, the location engine 120 may search for and/or look up the designated switch and/or port (and/or access point) in a physical location table of the data structure 132, and identifying in the data structure 132 a specific physical location (e.g., Room 126 of Region A, etc.) associated with the designated switch and/or port (and/or access point)

Next, the location engine 130 transmits, at 312, the retrieved physical location to the backend server associated with the VoIP application, the VoIP application, and/or the mobile communication device that initially transmitted the MAC address to the location engine 130 (at 302) (e.g., as part of a MACResolverURL function call, etc.). The VoIP application and/or backend server, then, may store the location in association with the emergency call (e.g., in a database, etc.) and/or append the location to the emergency call, whereby the entity receiving and/or handling the emergency call (e.g., a PSAP) may receive the location. It should again be appreciated that the receiving and/or handling entity may receive the location by accessing the stored location (e.g., from a database, etc.) and/or as part of the emergency call itself. In this manner, the location of the particular mobile communication device that initiated the emergency call may be identified.

Based on the configuration of the system 100 and implementation of method 300 described herein, it should be appreciated that the physical location of the mobile communication device may be dynamically determined. For example, if the mobile communication device later moves to another location (e.g., Room 124, the area covered by access point 116, etc.) and initiates another emergency call (or moves to another location and re-authenticates to the network platform 102 before initiating the emergency call, etc.), method 300, in conjunction with system 100, may again be used to provide location services in connection with the emergency VoIP call, notwithstanding the fact that the mobile communication device has changed locations.

In view of the above, the systems and methods herein permit the physical location of a mobile communication device to be reliably and dynamically determined, in connection with an emergency VoIP phone call, regardless of the mobile communication device's operating system, location, or point of connection to a network platform. In connection therewith, some embodiments do not require use of an SDN or dial number substitution. The MAC may be dynamically used to find the switch port used by the end user device, and the switch port versus a location database may be used to provide location data for the PSAP. What's more, the MAC may move from port to port, or even across wireless access points, and still be accurately located (for a wired port) (e.g., within 100 meters, within 50 meters, etc. (or more or less) for a wireless access point). In addition, some embodiments of the present disclosure may use an ISE monitoring server to dynamically locate the MAC relative to switch ports or wireless access points as the MAC moves through a network, instead of either storing the MAC statically or tying it to an SDN. The switch port location dynamically stored in the ISE monitoring server may then be used to determine the location of the user (such that the SDN may not be needed).

Some embodiments of the present disclosure may allow use of any MAC, and for the MAC to change (e.g., from day to day, etc.). As such, as an end device authenticates and connects to the network using the ISE monitoring server, the switch port used by the MAC that day may be dynamically stored in the ISE monitoring server as well. In such embodiments, since records for VoIP calls typically contain the end user device's MAC for each call made, a connection may be made directly between the MAC, the switch port, and the location, which can then be stored in the call record database for retrieval by the PSAP. No particular telecommunication switches or databases may thus be required other than the IP switch port to location table.

In some embodiments of the present disclosure, the only registration that may be required may occur when the IP port switch authenticates the user when the device connects to the network. As part of this authentication, the MAC of the user's device and switch where it is connected may be stored for audit purposes in the ISE monitoring server. No prior knowledge of the MAC is therefore required, and no SDN is related to the MAC. Moreover, in some embodiments of the present disclosure, no tandem switches are required. Instead, normal access switches may be used in such embodiments. Still further, some embodiments of the present disclosure may use a REST API call to access the authentication audit records stored by the ISE monitoring server as part of the connection process. Here, the audit records may contain the dynamic MAC and IP switch port used by the connection. Since the VoIP call records contain the user's MAC, the MAC may then be used to connect the call to the switch port used to make the call. Again, no SDN is required for either the IP switch port or the PSAP, nor does the network administrator need the MAC ahead of time. The IP switch port and wireless access point location is static, and is stored in a database that contains the exact location of the port inside a facility. This may allow for obtaining the call location using the MACresolverURL function for each call record.

Again and as previously described, it should be appreciated that the functions described herein, in some embodiments, may be described in computer executable instructions stored on a computer readable media, and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transforms a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one of the following operations: (a) receiving, at a location engine computing device, a media access control (MAC) address for a mobile communication device initiating a VoIP emergency call via a VoIP application, the mobile communication device connected to a network platform and initiating the VoIP emergency call through the network platform; (b) requesting, by the location engine computing device, from a server of the network platform, a designation for at least one of: (i) a switch and/or port through which the mobile communication device is connected to the network platform and (ii) an access point through which the mobile communication device is connected to the network platform; (c) receiving the designation from the server; (d) retrieving, by the location engine computing device, from a data structure, a physical location associated with the mobile communication device, based on the designation; and (e) transmitting the physical location, thereby permitting dynamic identification of the physical location of the mobile communication device in connection with the VoIP emergency call.

Exemplary embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for dynamically providing a physical location of a mobile communication device, connected to a network platform, in connection with a voice over internet protocol (VoIP) emergency call, the method comprising:

receiving, at a location engine computing device, a media access control (MAC) address, as part of a MACResolverURL function call to the location engine computing device, for a mobile communication device initiating a VoIP emergency call via a VoIP application, the mobile communication device connected to a network platform and initiating the VoIP emergency call through the network platform;

requesting, by the location engine computing device, from a server of the network platform, a designation for at least one of:

a switch and/or port through which the mobile communication device is connected to the network platform; and an access point through which the mobile communication device is connected to the network platform;
receiving the designation from the server;
retrieving, by the location engine computing device, from a data structure, a physical location associated with the mobile communication device, based on the designation; and
returning the physical location, in response to the MACResolverURL function call, thereby permitting dynamic identification of the physical location of the mobile communication device in connection with the VoIP emergency call.

2. The computer-implemented method of claim 1, further comprising maintaining, by the data structure, a physical location table identifying a plurality of designations, each of the plurality of designations relating to at least one of:
a switch and/or port; and
an access point;
wherein each designation is associated with a physical location, the physical location indicating a physical location of connection to the at least one of the switch and/or port and the access point.

3. The computer-implemented method of claim 1, wherein receiving the MAC address comprises receiving the MAC address from at least one of: the mobile communication device, the VoIP application, and a backend server associated with the VoIP application.

4. The computer-implemented method of claim 3, wherein returning the physical location comprises transmitting the physical location to at least one of: the mobile communication device, the VoIP application, and the backend server associated with the VoIP application; and
wherein the method further comprises appending, by the at least one of the mobile communication device, the VoIP application, and the backend server associated with the VoIP application, the physical location to the VoIP emergency call.

5. The computer-implemented method of claim 1, wherein requesting the designation includes submitting a REST API call to the server of the network platform.

6. The computer-implemented method of claim 5, wherein submitting the REST API call to the server of the network platform comprises submitting the MAC address to the server of the network platform.

7. The computer-implemented method of claim 1, wherein the server of the network platform comprises an identity services engine (ISE).

8. The computer-implemented method of claim 1, wherein the mobile communication device is authenticated to the network platform by the server of the network platform; and
wherein the server of the network platform maintains the designation for at least one of:
the switch and/or port through which the mobile communication device is connected to the network platform; and
the access point through which the mobile communication device is connected to the network platform.

9. A system for dynamically providing a physical location of a mobile communication device, connected to a network platform, in connection with a voice over internet protocol (VoIP) emergency call, the system comprising:
a data structure including a physical location table, the physical location table identifying a plurality of designations, each of the designations being for at least one of:
a switch and/or port; and
an access point;
wherein each of the designations is associated with a physical location, the physical location indicating a physical location of connection to the at least one of the switch and/or port and the access point;
a processor coupled to the data structure, the processor configured to:
receive a media access control (MAC) address, as part of a MACResolverURL function call, for a mobile communication device initiating a VoIP emergency call via a VoIP application, the mobile communication device connected to a network platform and initiating the VoIP emergency call through the network platform, the mobile communication device connected to the network platform through at least one of:
a switch and/or port; and
an access point;
request, from a server of the network platform, a designation of the at least one of: the switch and/or port through which the mobile communication device is connected to the network platform and the access point through which the mobile communication device is connected to the network platform;
receive the requested designation from the server;
retrieve, from the data structure, the physical location associated with the mobile communication device based on the designation; and
transmit the physical location as part of a response to the MACResolverURL function call, whereby the physical location of the mobile communication device may be dynamically identified in connection with the VoIP emergency call.

10. The system of claim 9, wherein the server is configured to:
authenticate the mobile communication device to the network platform; and
maintain a designation of the at least one of:
the switch and/or port through which the mobile communication device is connected to the network platform; and/or
the access point through which the mobile communication device is connected to the network platform.

11. The system of claim 9, wherein the processor is configured to receive the media access control (MAC) address from at least one of: the mobile communication device, the VoIP application, and a backend server associated with the VoIP application.

12. The system of claim 11, wherein the processor is configured to transmit the physical location to at least one of: the mobile communication device, the VoIP application, and the backend server associated with the VoIP application; and
wherein the at least one of the mobile communication device, the VoIP application, and the backend server is configured to append the physical location to the VoIP emergency call.

13. The system of claim 9, wherein the processor is configured to request, from the server, the designation by submitting a REST API call to the server.

14. The system of claim 13, wherein the REST API call includes the MAC address to the server; and/or
wherein the server comprises an identity services engine (ISE).

15. The system of claim 9, wherein at least one of the plurality of designations identified in the physical location table is associated with a physical location that is different from the physical location of the at least one of the switch and/or port and the access point.

16. The non-transitory computer-readable storage media including executable instructions for dynamically providing a physical location of a mobile communication device in connection with a voice over internet protocol (VoIP) emergency call, which, when executed by at least one processor, cause the at least one processor to:

receive a media access control (MAC) address, as part of a MACResolverURL function call, for a mobile communication device initiating a VoIP emergency call via a VoIP application, the mobile communication device connected to a network platform and initiating the VoIP emergency call through the network platform, the mobile communication device connected to the network platform through at least one of: (a) a switch and/or port and (b) an access point;

request, from a server of the network platform, a designation of the at least one of: (a) the switch and/or port through which the mobile communication device is connected to the network platform and (b) the access point through which the mobile communication device is connected to the network platform, via a REST API call to the server, the sever including an identity services engine (ISE);

receive the designation from the server;

retrieve, from a data structure, a physical location associated with the mobile communication device, based on the designation; and transmit the physical location, as part of a response to the MACResolverURL function call, whereby the physical location of the mobile communication device may be dynamically identified in connection with the VoIP emergency call.

17. The non-transitory computer-readable storage media of claim 16, wherein the executable instructions, when executed by the at least one processor, cause the at least one processor to:

receive the media access control (MAC) address from at least one of: the mobile communication device, the VoIP application, and a backend server associated with the VoIP application; and transmit the physical location to at the at least one of: the mobile communication device, the VoIP application, and the backend server associated with the VoIP application.

\* \* \* \* \*